(12) United States Patent
Sakaguchi et al.

(10) Patent No.: US 10,871,380 B2
(45) Date of Patent: Dec. 22, 2020

(54) VEHICLE CONTROL DEVICE

(71) Applicant: HITACHI AUTOMOTIVE SYSTEMS, LTD., Hitachinaka (JP)

(72) Inventors: Tomoyasu Sakaguchi, Tokyo (JP); Masashi Seimiya, Tokyo (JP); Yoshiyuki Yoshida, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/465,117

(22) PCT Filed: Mar. 15, 2018

(86) PCT No.: PCT/JP2018/010153
§ 371 (c)(1),
(2) Date: May 29, 2019

(87) PCT Pub. No.: WO2018/173907
PCT Pub. Date: Sep. 27, 2018

(65) Prior Publication Data
US 2019/0285432 A1 Sep. 19, 2019

(30) Foreign Application Priority Data
Mar. 23, 2017 (JP) .................. 2017-057221

(51) Int. Cl.
*G01C 22/00* (2006.01)
*G07C 5/06* (2006.01)
(Continued)

(52) U.S. Cl.
CPC .......... *G01C 22/00* (2013.01); *G06K 9/00791* (2013.01); *G06T 7/20* (2013.01);
(Continued)

(58) Field of Classification Search
None
See application file for complete search history.

(56) References Cited

U.S. PATENT DOCUMENTS 6,486,910 B1 * 11/2002 Kaneda ............. H04N 5/23248
348/208.5
2003/0163255 A1 * 8/2003 Ishigami ............. G01C 21/165
701/472
(Continued)

FOREIGN PATENT DOCUMENTS

JP 2000-097968 A 4/2000
JP 2002-267411 A 9/2002
(Continued)

OTHER PUBLICATIONS

International Search Report with English translation and Written Opinion issued in corresponding application No. PCT/JP2018/010153 dated Jun. 26, 2018.

*Primary Examiner* — Jefferey F Harold
*Assistant Examiner* — Humam M Satti
(74) *Attorney, Agent, or Firm* — Foley & Lardner LLP

(57) ABSTRACT

The present invention enhances estimation accuracy of a travel distance to estimate a position of a host vehicle. A vehicle control device 1 includes front and rear cameras 7 and 8 and a measurement control unit 23. The front and rear cameras 7 and 8 are provided at front and rear of a vehicle 10 to acquire information on an external world. The measurement control unit 23 calculate a travel distance of the vehicle 10 during traveling of the vehicle 10 in a predetermined driving state based on the information of an identical characteristic object 30 acquired by the front camera 7 and the rear camera 8, the rear camera 8 acquiring the information of the identical characteristic object 30 after the front camera 7 acquires the information.

8 Claims, 9 Drawing Sheets

(51) Int. Cl.
  *H04N 5/247* (2006.01)
  *G06T 7/20* (2017.01)
  *G06T 7/70* (2017.01)
  *G06K 9/00* (2006.01)
  *G07C 5/08* (2006.01)

(52) U.S. Cl.
  CPC ............... *G06T 7/70* (2017.01); *G07C 5/06* (2013.01); *H04N 5/247* (2013.01); *G06T 2207/30252* (2013.01); *G07C 5/08* (2013.01)

(56) References Cited

U.S. PATENT DOCUMENTS

| | | | |
|---|---|---|---|
| 2004/0221790 A1 | 11/2004 | Sinclair | |
| 2005/0190049 A1* | 9/2005 | Kuchler | B60C 23/0408 340/445 |
| 2007/0088478 A1* | 4/2007 | Mori | G01S 11/12 701/41 |
| 2010/0292895 A1* | 11/2010 | Nakamura | G08G 1/09623 701/41 |
| 2014/0139674 A1* | 5/2014 | Aoki | G06T 7/85 348/148 |
| 2015/0208041 A1* | 7/2015 | Wang | H04N 7/183 348/148 |
| 2015/0298621 A1* | 10/2015 | Katoh | G08G 1/165 348/148 |
| 2015/0317526 A1* | 11/2015 | Muramatsu | G06K 9/00798 348/148 |
| 2016/0140718 A1* | 5/2016 | Ishida | G06K 9/00791 345/419 |
| 2017/0008521 A1* | 1/2017 | Braunstein | G05D 1/0287 |
| 2017/0147889 A1* | 5/2017 | Okano | G06K 9/209 |
| 2018/0198955 A1* | 7/2018 | Watanabe | B60R 11/02 |

FOREIGN PATENT DOCUMENTS

| | | |
|---|---|---|
| JP | 2004-317206 A | 11/2004 |
| JP | 2008-082925 A | 4/2008 |
| JP | 2009-115485 A | 5/2009 |
| JP | 2012-093100 A | 5/2012 |
| JP | 2013-120398 A | 6/2013 |
| WO | WO-2008/139516 A1 | 11/2008 |

* cited by examiner (a) CAPTURED IMAGE OF CHARACTERISTIC OBJECT BY FRONT CAMERA (b) CAPTURED IMAGE OF CHARACTERISTIC OBJECT BY REAR CAMERA (c) SLIDE CAPTURED IMAGE OF CHARACTERISTIC OBJECT BY FRONT CAMERA AND CAPTURED IMAGE OF CHARACTERISTIC OBJECT BY REAR CAMERA FORWARD AND REARWARD FOR COLLATION

IT IS REGARDED THAT LEFT AND RIGHT WHEEL
SPEED PULSE COUNT NUMBERS ARE EQUAL

DETECT INCLINATION OF ROAD SURFACE
OR DETECT CHANGE OF
TRAVELING RESISTANCE BY G SENSOR (a)

(b)

(a)

(b)

IT IS POSSIBLE TO IMAGE DIRECTION
CLOSER TO SIDE IMMEDIATELY BELOW

VEHICLE CONTROL DEVICE

TECHNICAL FIELD

The present invention relates to a vehicle control device that estimates a wheel travel distance to estimate a position of a host vehicle.

BACKGROUND ART

In recent years, a wheel speed sensor mounted on each wheel of a vehicle has been used to estimate a position of the host vehicle in automatic driving, automatic parking, and a navigation. The wheel speed sensor generates a pulsed signal per fixed rotation angle (for example, four degrees). As a travel distance per pulse (one pulse distance) is input and set in advance, the travel distance of each wheel can be calculated based on the generated pulsed signal, and not only speed and a movement distance of the vehicle but also a turning state of the vehicle can be understood based on a difference between travel distances of the left and right wheels. However, the one pulse distance or a travel distance per tire rotation (tire circumferential length) is not changed if once set unless the setting is updated. For example, when the tire circumferential length has changed due to tire replacement, wear, aging, or the like an error occurs in a travel distance measured by the wheel speed sensor. Thus, if the one pulse distance or tire circumferential length (hereinafter collectively referred to as one pulse distance) changes, it is necessary to correct the change.

Several correction methods have been devised to correct such a change in one pulse distance. For example, there is a method of comparing measurement of vehicle speed (travel distance) by a global positioning system (GPS) with a wheel speed pulse count number. The method using the GPS is considered that it is difficult to obtain the accuracy necessary for correcting one pulse distance because a fluctuation in the measurement by the GPS itself is great.

PTL 1 discloses continuously acquiring images of an identical characteristic object on a road during traveling, measuring a vehicle speed pulse number between timings, and correcting one pulse distance based on a calculated travel distance and a vehicle speed pulse at the time corresponding to the travel distance.

PTL 2 discloses using a stereo camera mounted on a vehicle to measure a distance with respect to a stationary object in front of the stereo camera and correcting one pulse distance of a vehicle speed pulse using a change in the distance with respect to the stationary object caused by traveling of the vehicle as a reference distance.

PTL 3 discloses correcting one pulse distance of a vehicle speed pulse using road distance information between two points obtained from the outside as a reference distance.

CITATION LIST

Patent Literature

PTL 1: JP 2008-82925 A
PTL 2: JP 2004-317206 A
PTL 3: JP 2009-115485 A

SUMMARY OF INVENTION

Technical Problem

As disclosed in PTL 1, however, a distance from the camera to the characteristic object is long or there is a limit on a length of a reference distance to be used to measure the vehicle speed pulse number when the images of the characteristic object are acquired by one camera, and thus, it is difficult to improve accuracy.

PTL 2 simply does not limit a characteristic object to a characteristic object on a road surface, and has the same problem as PTL 1.

PTL 3 has other problems such as accuracy and an acquisition method of the road distance information and detection accuracy of a reference point.

An angular resolution of a camera is determined by each of an elevation angle direction from the front of the camera and left and right angle directions, and a distance resolution of the camera is proportional to a direction of the camera with respect to an object to be imaged and a distance between the camera and the object to be imaged.

Further, in general, the angular resolution of the camera is not uniform over the entire surface of a captured image of the camera. In many cases, the angular resolution is relatively good in a central portion of the captured image, and the angular resolution is not relatively good in a peripheral portion. Therefore, it is difficult to improve the measurement accuracy unless the characteristic object is captured in a direction in which the angular resolution of the camera is good while narrowing the distance between the camera and the characteristic object to be used as the reference distance.

Further, it is necessary to take the reference distance longer in order to reduce such a problem of detection accuracy of the characteristic object. However, a vehicle needs to travel straight while the vehicle travels the reference distance for measurement of the characteristic object so that the reference distance that is too long is not practical.

Therefore, an object of the present invention is to enhance estimation accuracy of the travel distance to estimate a position of a host vehicle.

Solution to Problem

A control device of a vehicle includes a plurality of information acquisition units and a travel distance calculation unit. The plurality of information acquisition units are provided at front of and rear of the vehicle and acquire information of an external world. The travel distance calculation unit calculates a travel distance of the vehicle during traveling of the vehicle in a predetermined driving state based on information of an identical characteristic object acquired by a front information acquisition unit and a rear information acquisition unit, the rear information acquisition unit acquiring the information of the identical characteristic object after the front information acquisition unit out of the plurality of information acquisition units acquires information of the identical characteristic object.

Advantageous Effects of Invention

It is possible to secure a reference distance between the information acquisition units and to measure an actually travel distance within an area where the front and rear cameras have favorable accuracy.

DESCRIPTION OF EMBODIMENTS

Several embodiments will be described in detail with reference to the drawings. In each of the drawings, members or elements having the same operation or function will be denoted by the same reference signs, and redundant descriptions thereof will be omitted as appropriate.

First Embodiment

Figure 1:
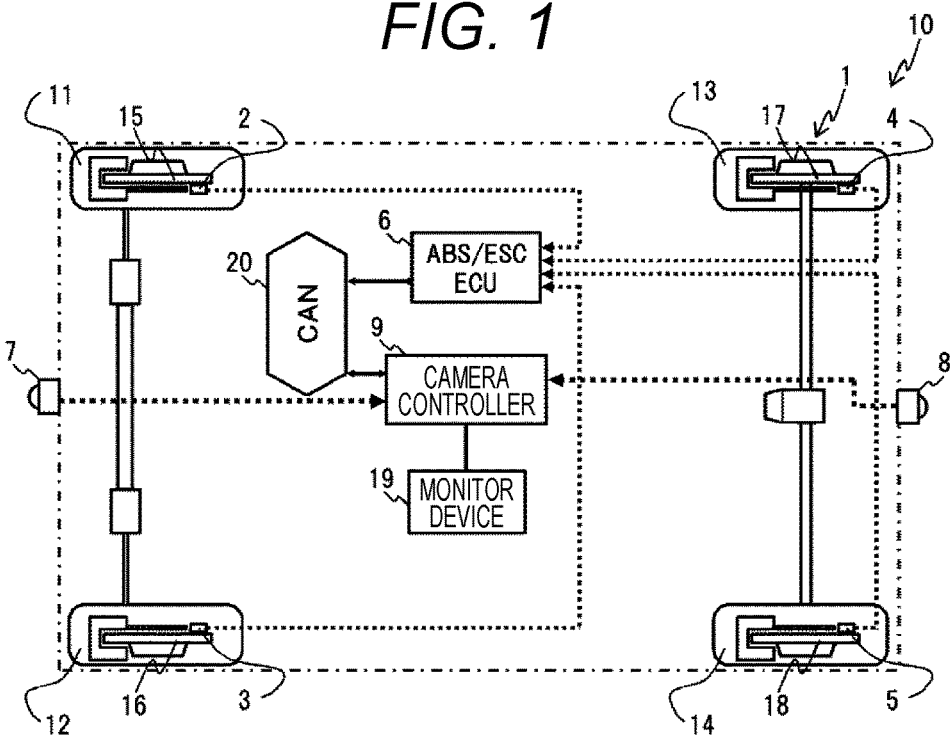
FIG. 1 is a schematic structural view of a vehicle according to a first embodiment.

FIG. 1 is a schematic configuration view illustrating an example of a vehicle including a vehicle control device according to the present embodiment.

A vehicle control device 1 is mounted on a vehicle 10. The vehicle control device 1 includes: wheel speed sensors 2 to 5 as "travel state detection units"; an ABS/ESC ECU (Electronic Control Unit) 6; front and rear cameras 7 and 8 as a "front information acquisition unit" and a "rear information acquisition unit"; and a camera controller 9.

The wheel speed sensors 2 to 5 are connected to the ABS/ESC ECU 6, and generates a pulse waveform as sensor rotors 15 to 18 attached to wheels 11 to 14 are rotated so that recesses and protrusions provided on the sensor rotors 15 to 18 pass each other. The camera controller 9 is wired to the wheel speed sensors 2 to 5, detects rising and falling of the pulse waveform, and counts the number of times thereof. The total number of rising and falling of the pulse waveform during one rotation of the wheels 11 to 14 is determined depending on the number of teeth of the sensor rotors 15 to 18, and is counted, for example, 90 times per wheel rotation. The front and rear cameras 7 and 8 are connected to the camera controller 9 and sequentially transmit external world image data of the vehicle 10 to the camera controller 9. The camera controller 9 recognizes various external worlds based on the image data, and processes an image and displays the image on a monitor device 19 so that the image can be viewed by an occupant.

The ABS/ESC ECU 6 and the camera controller 9 can communicate with each other via an in-vehicle network (CAN) 20. The ABS/ESC ECU 6 transmits a message including counter values obtained by counting the pulse waveforms of the wheel speed sensors 2 to 5 to the CAN 20. Other controllers including the camera controller 9 can acquire the counter values of the wheel speed sensors 2 to 5 by receiving this message from the CAN 20.

Figure 2:
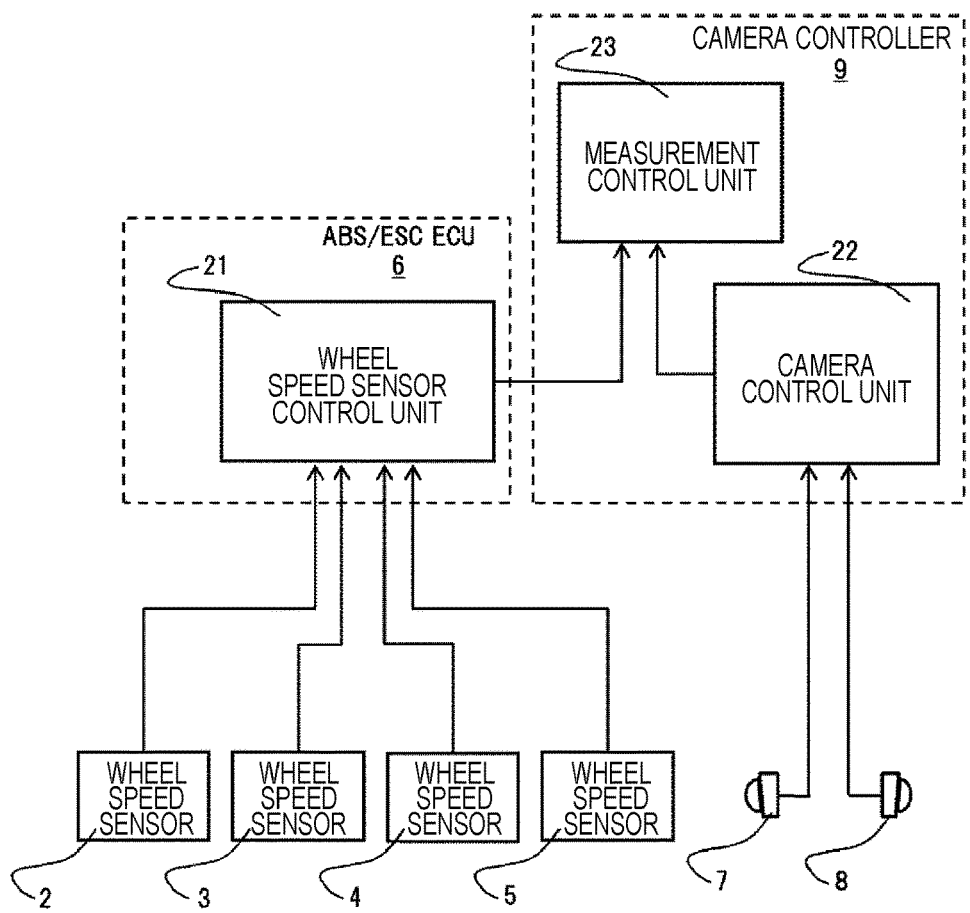
FIG. 2 is a block diagram of a vehicle control device according to the first embodiment.

FIG. 2 is a control block diagram of the vehicle control device.

The vehicle control device 1 includes, as basic components, a wheel speed sensor control unit 21, a camera control unit 22, and a measurement control unit 23 as a "travel distance calculation unit". The vehicle control device 1 measures a wheel speed pulse distance based on signals input from the wheel speed sensors 2 to 5, the front camera 7, and the rear camera 8.

Figure 3:
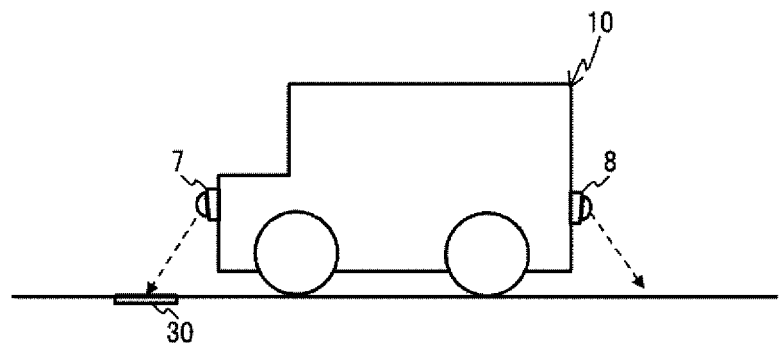
FIG. 3 is a side view of the vehicle according to the first embodiment.

FIG. 3 is a view illustrating a method of installing the front and rear cameras on the vehicle.

The front and rear cameras 7 and 8 are provided, for example, at a front end and a rear end of the vehicle 10, and can capture images of the front and a road surface thereof and the rear and a road surface thereof during traveling of the vehicle 10 to acquire information of an identical characteristic object 30 on the road surface.

Figure 4:
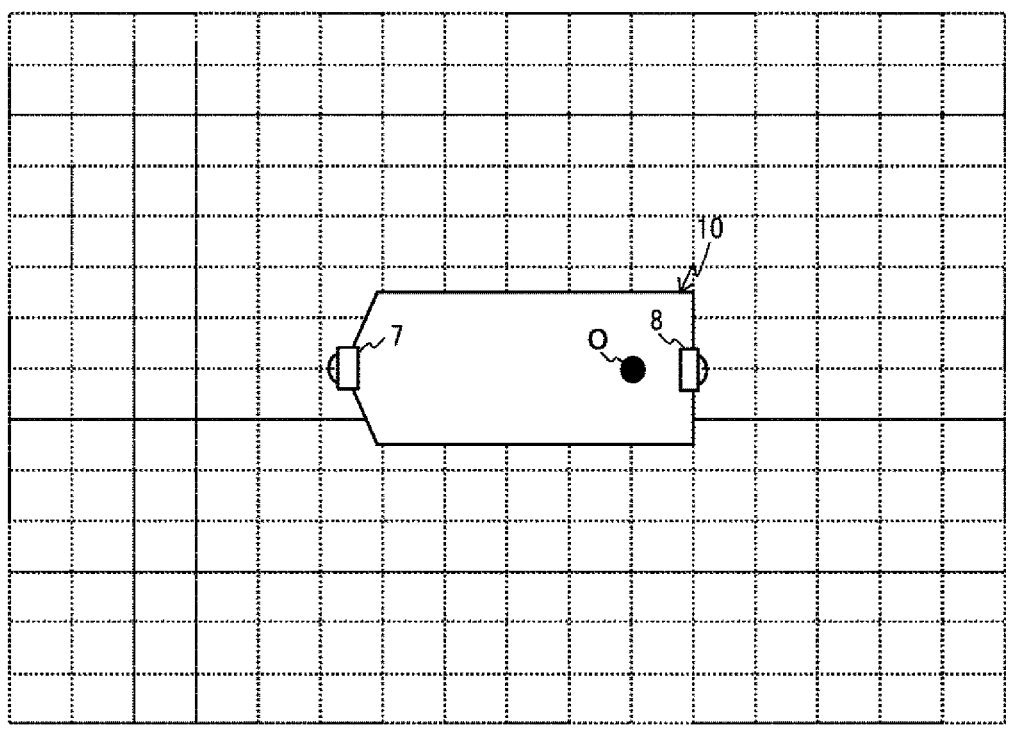
FIG. 4 is an explanatory view of a calibration method by a camera according to the first embodiment.

FIG. 4 is a view illustrating a calibration method of the front and rear cameras.

After mounting the front and rear cameras 7 and 8 to the vehicle 10, the vehicle 10 is stopped in advance at a location with a road surface marking for which a relative position with the vehicle 10 has been known, and the road surface marking is imaged by the front and rear cameras 7 and 8 in order to correct an error of mounting accuracy or manufacturing errors of the front and rear cameras 7 and 8 themselves. As a result, a display position of the road surface marking on the captured image is associated with the relative position with the vehicle 10. Even a blank area between road surface markings is appropriately supplemented based on characteristics of the front and rear cameras 7 and 8 and camera lenses so as to make association with the relative positions with the vehicle 10 on the road surface for the whole captured image. As a method of expressing the relative position with the vehicle 10, for example, a coordinate system having a center of a rear wheel axle of the vehicle 10 as an origin O is used.

Figure 5:
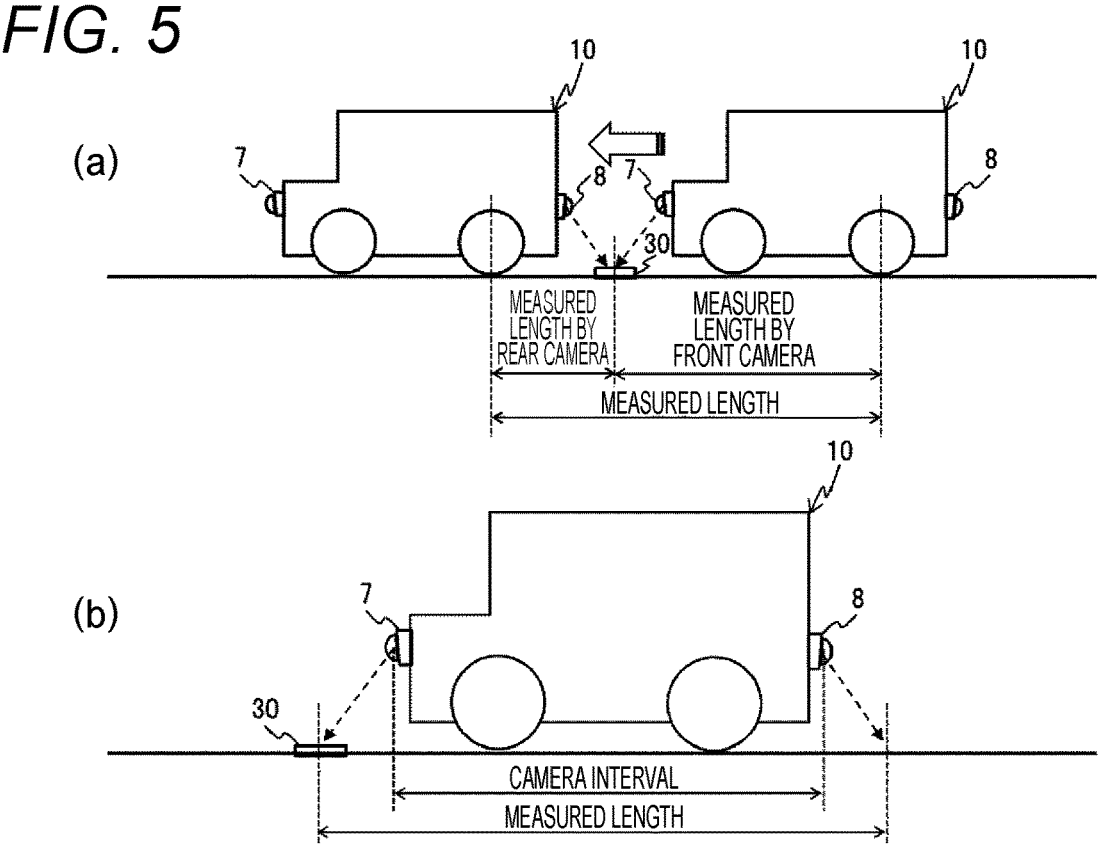
FIG. 5 is an explanatory view of a measurement principle of a wheel speed pulse distance according to the first embodiment.

FIG. 5 is a view illustrating a measurement principle of the vehicle control device.

The relative position with the vehicle 10 of the characteristic object 30 imaged by the front camera 7 is stored, and a value at the time of imaging of a wheel speed pulse counter value received from the ABS/ESC ECU 6 is stored. The vehicle 10 travels straight and images the identical characteristic object 30 using the rear camera 8. A movement distance per wheel speed pulse counter value can be calculated using the relative position with the vehicle of the characteristic object 30 imaged by the rear camera 8 and a value of the wheel speed pulse counter value at that time. A calculation formula is set as (Measurement Distance By Front Camera 7+Measurement Distance By Rear Camera 8)/(Increment Count of Wheel Speed Pulse Counter Value).

Figure 6:
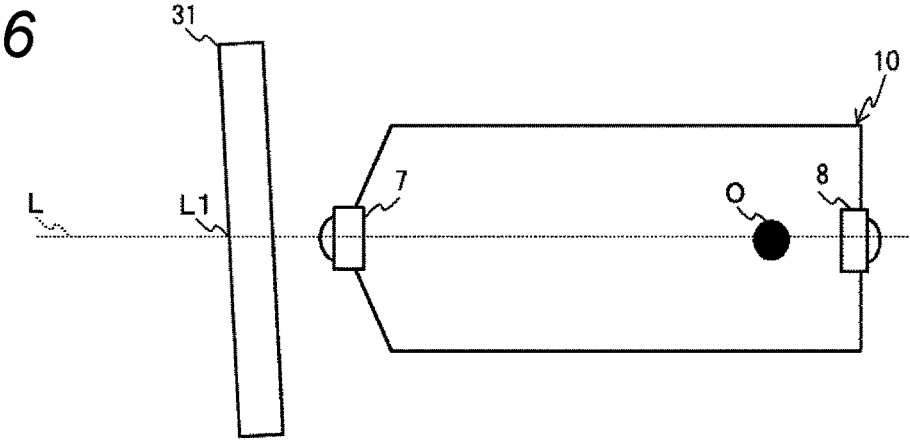
FIG. 6 is a plan view for describing a relationship between the vehicle according to the first embodiment and a characteristic object.

FIG. 6 is a view of a linear characteristic object as viewed from above.

The characteristic object 30 is displayed on a road, and may be a linear marking 30a that is directed substantially at a right angle with respect to a progressing direction of the vehicle 10. When imaging the linear marking 30a, for example, coordinates L1 of an intersection with a center line L of captured images of the front and rear cameras 7 and 8 or coordinates of an intersection with the center line in the coordinate system of the vehicle 10 are used as a relative position of the linear marking 30a with the vehicle 10.

Figure 7:
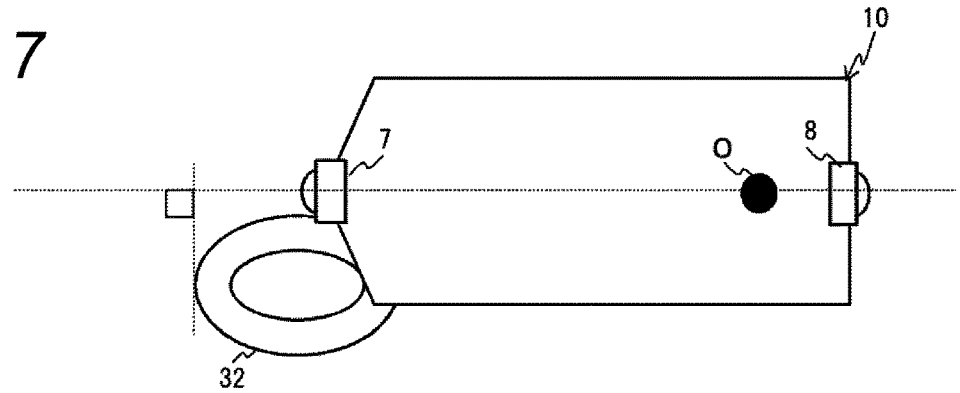
FIG. 7 is a plan view for describing a relationship between the vehicle according to the first embodiment and a characteristic object.

FIG. 7 is a view of a characteristic object other than the linear shape as viewed from above.

The characteristic object 30 may be, for example, a circular characteristic object. Even when imaging a circular characteristic object 30b, it is possible to handle the circular characteristic object 30b in the same manner as in the case of the linear marking 30a if a portion of the circular characteristic object 30b, the portion close to a right angle with respect to the progressing direction intersects with the center line of the captured images of the front and rear cameras 7 and 8 or the center line in the coordinate system of the vehicle 10. Further, when a characteristic point of the circular characteristic object 30b recognized by the front camera 7 can be recognized by the rear camera 8, front and rear coordinates of such a characteristic point may be used. As such a characteristic point, for example, there is a method of using a point on the forefront of the circular characteristic object 30b as viewed from the vehicle 10 as the characteristic point.

Figure 8:
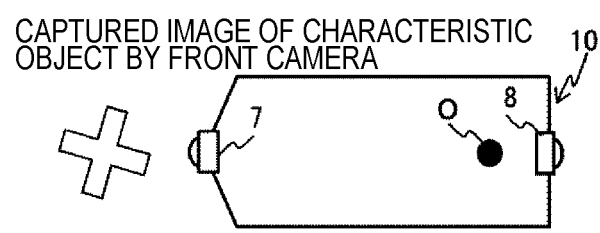
FIG. 8 is an explanatory view of collation of captured images obtained by front and rear cameras according to the first embodiment.
Figure 8:
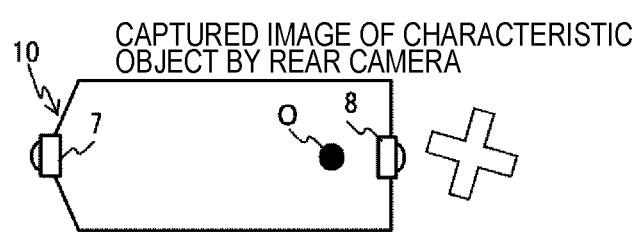
Figure 8:
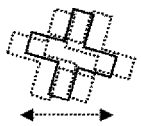

FIG. 8 is a view illustrating how the image captured by the front camera and the image captured by the rear camera are collated.

The image captured by the rear camera 8 is slid forward and rearward with respect to the image captured by the front camera 7 to specify the most coincident point and specify the amount of movement of the vehicle.

Figure 9:
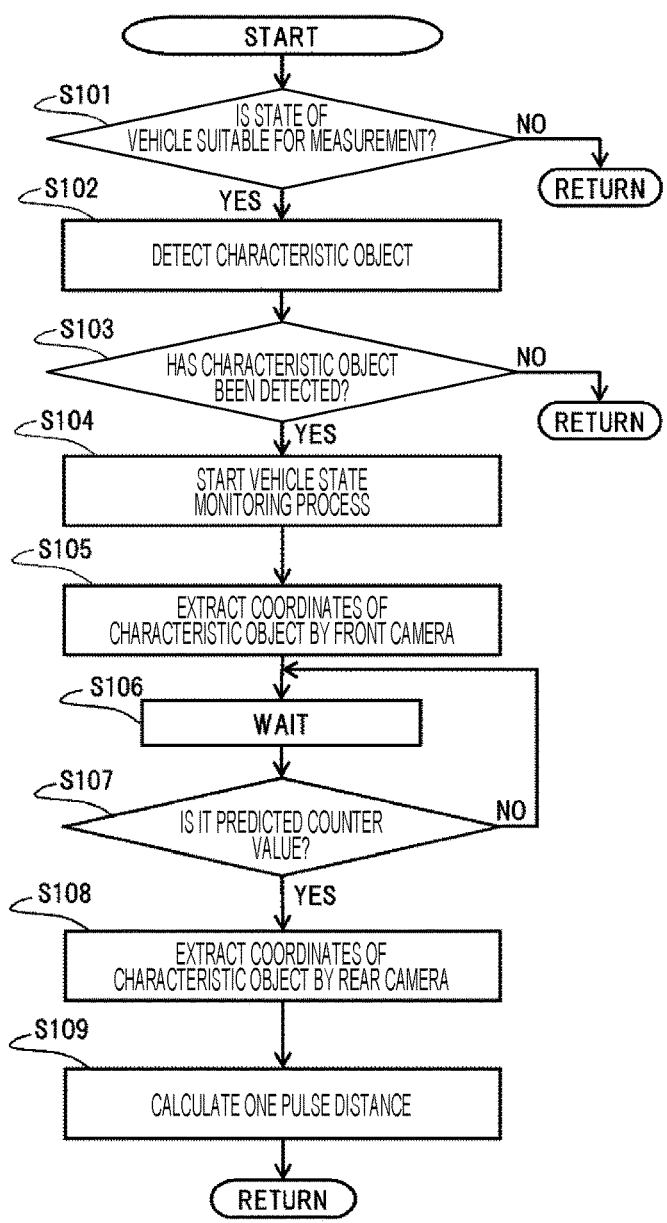
FIG. 9 is flow of a measurement process according to the first embodiment.

FIG. 9 is a flowchart of a measurement process of the present invention.

First, it is determined whether a state of the vehicle 10 is a state suitable for measurement (S101). Examples of measurement conditions include a vehicle speed upper limit condition, a straight traveling condition, an acceleration or deceleration condition, a road surface condition, and the like.

If a result of the determination in S101 is true (S101: YES), the front camera 7 detects the characteristic object 30 (S102). Specifically, a candidate for the characteristic object 30 is detected by a captured image obtained with a resolution of the front camera 7 reduced. If the determination result in S101 is false (S101: NO), the present measurement process is immediately stopped.

Next, it is determined whether the candidate of the characteristic object 30 has been detected (S103). When the candidate of the characteristic object 30 is detected (S103: YES), another process of monitoring the measurement condition during the measurement is activated, and the monitoring is started (S104). If a result of the monitoring is NG (S103: NO), the present measurement process is immediately stopped.

Next, high-accuracy imaging is performed in a state where the camera resolution is optimized. The imaging is performed a plurality of times every operation cycle of the front camera 7, data with the most accurate characteristic object coordinates is adopted and stored in a memory with a wheel speed pulse counter value at that time (S105).

Next, weighting is performed until a predicted counter value of the wheel speed pulse counter at which imaging by the rear camera is required (S106). Incidentally, a value obtained by adding an integer calculated, for example, from (vehicle length/length per count) to the current counter value is used as the predicted counter value.

When the wheel speed pulse counter value becomes the predicted counter value (S107: YES), imaging by the rear camera 8 is started. The imaging is performed a plurality of times every operation cycle of the rear camera 8 (S108), data with the most accurate characteristic object coordinates is adopted and stored in the memory with the wheel speed pulse counter value at that time. Finally, one pulse distance is calculated (S109).

Figure 10:
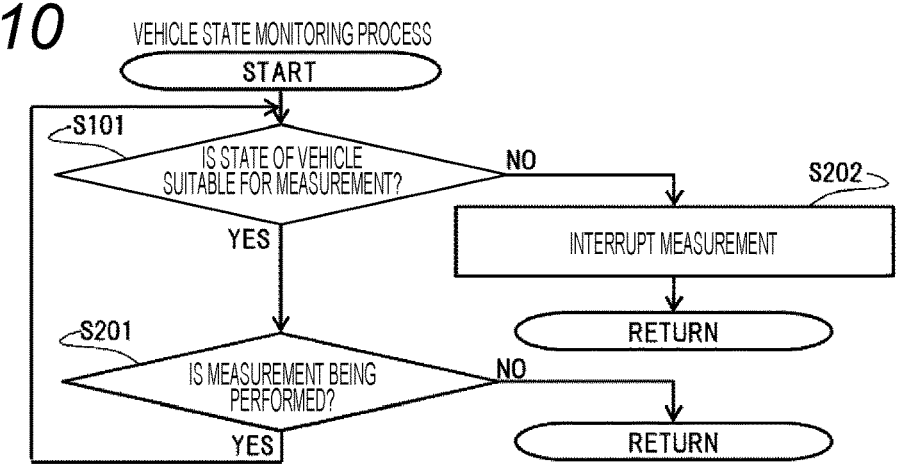
FIG. 10 is flow of a vehicle state monitoring process according to the first embodiment.

FIG. 10 is a flowchart of a vehicle state monitoring process.

The vehicle state monitoring process of S104 in FIG. 9 will be described. In the vehicle state monitoring process, it is determined whether a state of the vehicle 10 is a state suitable for measurement (S101). If a result of the determination in S101 is true (S101: YES), it is determined whether the measurement is being performed (S201). If the determination result in S201 is true (S201: YES), the process returns to S101. If the determination result in S201 is false (S201: NO), the process returns to the initial state. If the determination result in S101 is false (S201: NO), the measurement is interrupted (S202) to return to the initial state.

Figure 11:
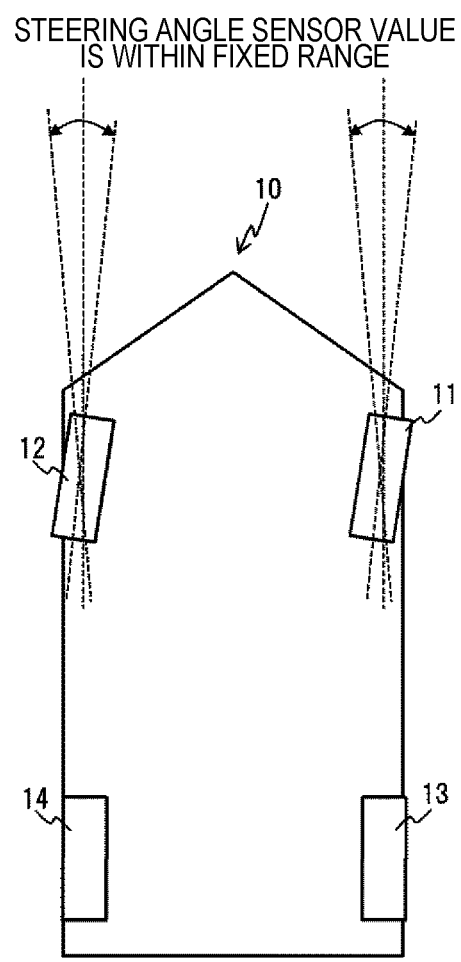
FIG. 11 is an explanatory view of a straight traveling condition of the measurement process according to the first embodiment.

FIG. 11 is a view illustrating the straight traveling condition for implementation of the measurement process.

When a steering sensor indicates a steering angle sensor value within a fixed range representing straight traveling, it is possible to determine that the vehicle 10 travels straight.

Figure 12:
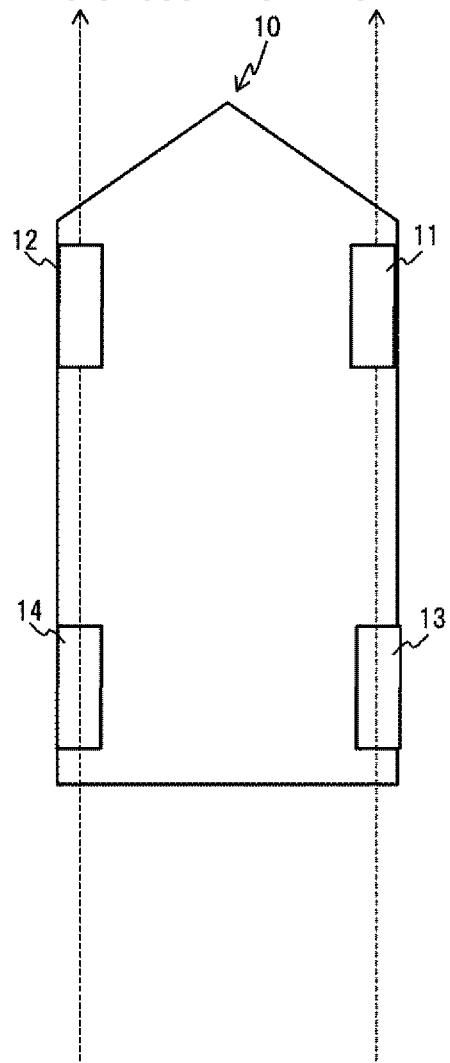
FIG. 12 is an explanatory view of the straight traveling condition of the measurement process according to the first embodiment.

FIG. 12 is a view illustrating the straight traveling condition for implementation of the measurement process.

Assuming that tire circumferential lengths of the left and right wheels 11 to 14 are equal, it is possible to determine that the vehicle 10 has traveled straight while changes of left and right wheel speed pulse counter values are the same.

Figure 13:
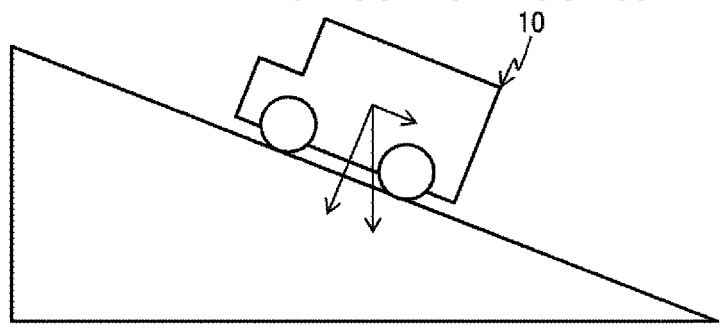
FIG. 13 is an explanatory view of a road surface condition of the measurement process according to the first embodiment.

FIG. 13 is a view illustrating the road surface condition for implementation of the measurement process.

When a road surface has slopes in a front-rear direction and a left-right direction of the vehicle 10, loads on the respective wheels 11 to 14 of the vehicle 10 change. Accordingly, a pitch angle and a roll angle of the vehicle 10 are generated, and positions of the front and rear cameras 7 and 8 with respect to the road surface also change. If such a change becomes large, a correspondence relationship between the captured image and the vehicle coordinates adjusted by the calibration also largely changes, and thus, it is determined whether measurement is possible using a certain threshold. Further, whether the measurement is possible is determined using the threshold even in a case where a large pitch angle is generated due to acceleration or deceleration. The slope and acceleration or deceleration can be detected from a G sensor mounted on the ABS/ESC ECU 6 or a vehicle speed value.

Figure 14:
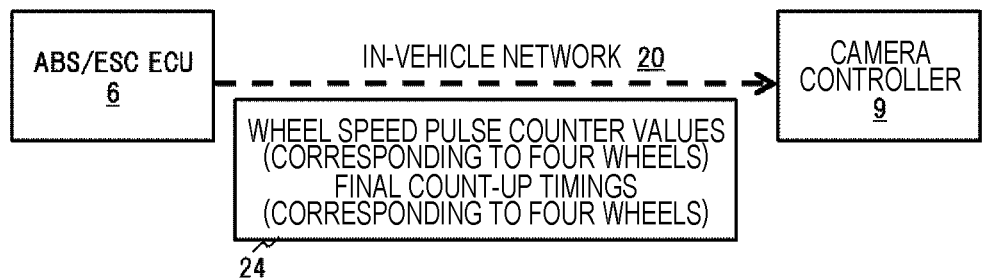
FIG. 14 is an explanatory view of a communication state of the measurement process according to the first embodiment.

FIG. 14 illustrates a system in which a pulse detection timing is notified with a time resolution higher than a communication cycle.

When a pulse detection interval can be measured with a shorter resolution than a message transmission cycle with respect to in-vehicle network 20, the ABS/ESC ECU 6 has a timer or a minute cycle counter configured to measure the pulse detection interval therein. The ABS/ESC ECU 6 reads a value of the timer or a value of the minute cycle counter at a transmission timing of a message 24 and adds the read value to the message 24, thereby enabling this system. As a result, assuming the wheel speed is substantially constant, a pulse count number at the transmission timing of the message 24 can be handled with a numerical value less than an integer in a pseudo manner. Accordingly, it is possible to reduce an error due to the resolution caused as the pulse count number is the integer.

According to the present embodiment, the vehicle control device 1 includes the front and rear cameras 7 and 8 and the measurement control unit 23. The front and rear cameras 7 and 8 are provided at front and rear of a vehicle 10 to acquire information of external world. The measurement control unit 23 calculate the travel distance of the vehicle 10 during traveling of the vehicle 10 in a predetermined driving state based on the information of the identical characteristic object 30 acquired by the front camera 7 and the rear camera 8, the rear camera 8 acquiring the information of the identical characteristic object 30 after the front camera 7 acquires the information. Accordingly, the identical characteristic object 30 can be captured even by the rear camera 8 as close as possible after the characteristic object 30 on the road is captured by the front camera 7 as close as possible during traveling of the vehicle 10, and thus, it is possible to measure the actual travel distance in an area where the front and rear cameras 7 and 8 have favorable accuracy while securing a reference distance.

The vehicle control device 1 includes the wheel speed sensors 2 to 5 that detect the travel state of the vehicle 10, and corrects the travel distance of the vehicle 10 calculated by the measurement control unit 23 based on results detected by the wheel speed sensors 2 to 5 after the front camera 7 acquires the information of the identical characteristic object 30 before the rear camera 8 acquires the information. As a result, the travel distance per pulse of the wheel speed pulse can be calculated based on the wheel speed pulse and the count number, and it is possible to enhance the measurement accuracy of the travel distance of the vehicle 10 calculated by the measurement control unit 23.

The front camera 7 is an imaging device that captures an image of the front of the vehicle 10, and the rear camera 8 is an imaging device that captures an image of the rear of the vehicle 10, and thus, existing on-vehicle cameras that acquire information on the external world can be also used as the front camera 7 and the rear camera 8.

The predetermined driving state is a state where the steering of the vehicle 10 is neutral, and thus, it is possible to detect an inclination of the vehicle body 10 and to enhance the measurement accuracy of the travel distance.

The wheel speed sensors 2 to 5 acquire the wheel speed pulses of the left and right wheels, and the predetermined driving state is a state where the wheel speed pulses of the left and right wheels 11 to 14 coincide with each other, and thus, the detection accuracy of the inclination of the vehicle body 10 is enhanced, and it is possible to enhance the measurement accuracy of the travel distance.

The vehicle 10 includes an acceleration sensor, and the predetermined driving state is a state where the acceleration sensor does not detect acceleration, and thus, the inclination of the vehicle body 10 is easily detected, and it is possible to enhance the measurement accuracy of the travel distance.

The wheel speed sensors 2 to 5 detect the rotational speed of the wheels 11 to 14, and a detection cycle of the rotational speed of the wheels 11 to 14 is set to be shorter than the transmission cycle with respect to the measurement control unit 23, and thus, it is possible to finely divide the pulse count number and to enhance the measurement accuracy of the travel distance.

Second Embodiment

In the present embodiment, sensor devices that scan a road surface are used as front and rear information acquisition units instead of cameras. Since the purpose of use of an external information acquisition device in the present invention is extraction of a characteristic point of the road surface, various types of sensor devices capable of such extraction can be used.

Figure 15:
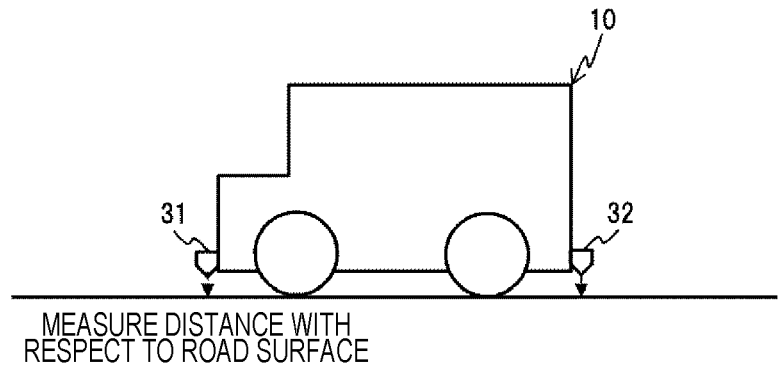
FIG. 15 is an explanatory view of a road surface unevenness detection sensor according to a second embodiment.
Figure 15:
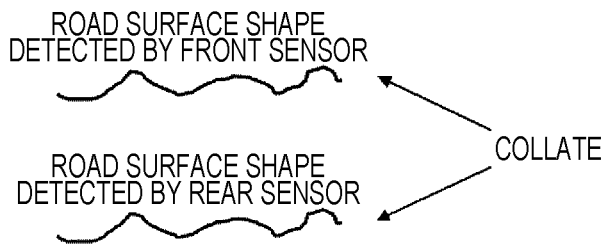

FIG. 15 is a view for describing a road surface unevenness detection sensor.

Road surface unevenness detection sensors 31 and 32 are installed downward on the vehicle 10, and measure a distance between road surface unevenness and the road surface. Incidentally, any type of sensor may be used as long as the sensor is capable of measuring a distance. A reference distance is measured by collating an unevenness shape detected by the front sensor 31 with an unevenness shape detected by the rear sensor 32. Alternatively, characteristic points may be extracted from the unevenness shapes similarly to the case of using the front and rear cameras 7 and 8, and relative coordinates with respect to the vehicle 10 and wheel speed pulse counter values may be acquired respectively for an identical characteristic point extracted by the front sensor 31 and the rear sensor 32.

Since the vehicle control device 1 includes the sensors that scan the changes in the unevenness of the road surface during traveling of the vehicle 10, it is possible to measure the characteristic object 30 in accordance with a road surface shape and to enhance the measurement accuracy of the characteristic object 30.

Third Embodiment

Figure 16:
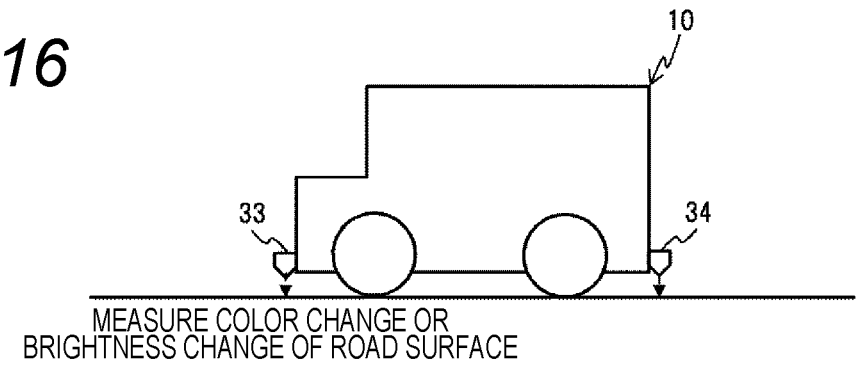
FIG. 16 is an explanatory view of a road surface marking detection sensor according to a third embodiment.
Figure 16:
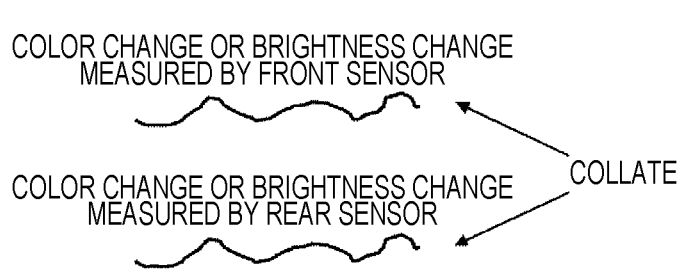

FIG. 16 is a view for describing a road surface marking detection sensor.

Road surface marking detection sensors 33 and 34 are installed downward on the vehicle 10 and measure a color and brightness of a road surface. Any type of sensor may be used as long as the sensor is capable of identifying the color and brightness of the road surface. A reference distance is measured by collating a color change or a brightness change detected by the front sensor 33 with a color change or a brightness change detected by the rear sensor 34. Alternatively, characteristic points may be extracted from the color change or brightness change similarly to the case of using the front and rear cameras 7 and 8, and relative coordinates with respect to the vehicle 10 and wheel speed pulse counter values may be acquired respectively for an identical characteristic point extracted by the front sensor 33 and the rear sensor 34.

Since the vehicle control device 1 includes the sensors that scan the changes in the luminous intensity or color of the road surface during traveling of the vehicle 10, it is possible to measure the characteristic object 30 in accordance with a road surface type and to enhance the measurement accuracy of the characteristic object 30.

Fourth Embodiment

Figure 17:
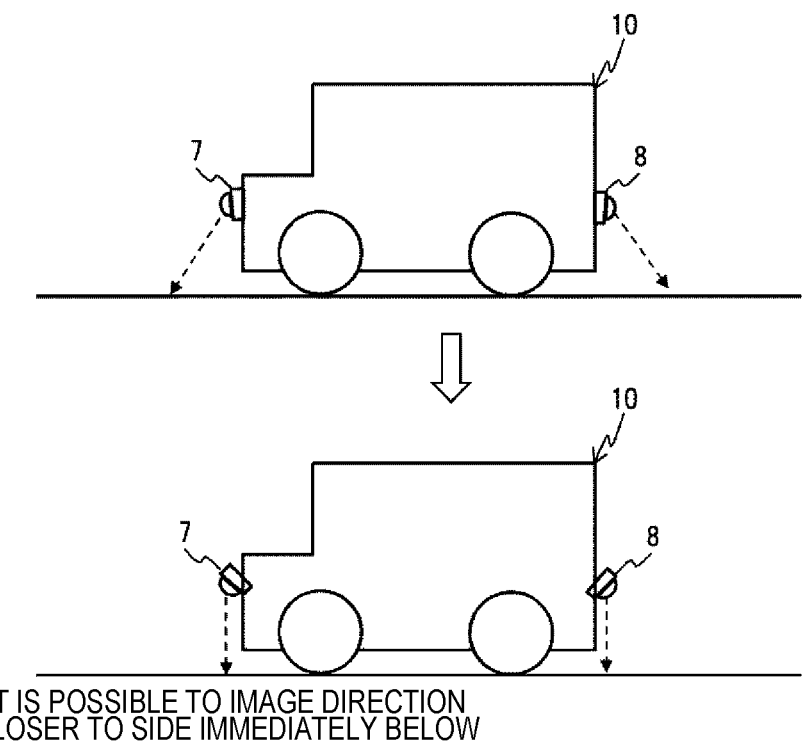
FIG. 17 is an explanatory view of measurement postures by front and rear cameras according to a fourth embodiment.

FIG. 17 is a view in which an imaging direction of a camera is directed to the ground side more than usual in order to improve accuracy in distance measurement of a characteristic object by imaging during the present measurement.

For example, elevation angles of the front and rear cameras 7 and 8 may be directed to the ground side before the front and rear cameras 7 and 8 image the information of the characteristic object 30. As a result, it is possible to enhance each distance resolution per pixel of the front and rear cameras 7 and 8 while suppressing influence of a camera optical axis shift caused by a change of an attitude of the vehicle 10 or a camera vibration, and it is possible to improve the measurement accuracy of the characteristic object 30.

Although the embodiments of the present invention have been described in detail as above, the present invention is not limited to the above-described embodiments, but includes various modified examples. For example, the above-described embodiments have been described in detail in order to describe the present invention in an easily understandable manner, and are not necessarily limited to one including the entire configuration that has been described above. In addition, some configurations of a certain embodiment can be added to configurations of another embodiment, and some configurations of a certain embodiment can be also deleted or substituted by configurations of another embodiment.

After the front camera 7 acquires the information of the characteristic object 30, the time at which the rear camera 8 acquires the information of the identical characteristic object 30 may be estimated. As a result, it is sufficient if the information can be acquired only before and after the timing at which the rear camera 8 acquires the information of the identical characteristic object 30, and thus, it is possible to reduce the number of times of capturing performed by the rear camera 8.

REFERENCE SIGNS LIST

1 vehicle control device
7 front camera
8 rear camera
10 vehicle
23 measurement control unit
30 characteristic object
30*a* linear marking
30*b* circular characteristic object
31, 32 road surface unevenness detection sensor
33, 34 road surface marking detection sensor

The invention claimed is:

1. A vehicle control device comprising:
a plurality of sensors that are provided at a front of and a rear of a vehicle and acquire information of an external world;
a plurality of wheel speed sensors that detect the wheel speed pulses of the wheels of the vehicle; and
at least one electronic control unit (ECU) which is communicably coupled to the plurality of sensors via an in-vehicle network (CAN), the at least one ECU being configured to acquire information about a feature on a road surface by a rear sensor of the plurality of sensors after a front sensor of the plurality of sensors acquires information about the same feature while the vehicle is traveling in a predetermined driving state, and acquires a wheel speed pulse count value of the vehicle from the plurality of wheel speed sensors when each of the front sensor and the rear sensor acquires the information about the same feature,
wherein the at least one ECU is configured to correct a travel distance per wheel speed pulse count value of the vehicle based on a default measurement length of the vehicle, which is a sum of a measurement length by the front sensor and the measurement length by the rear sensor, and an increment of the wheel speed pulse count value of the vehicle when each of the front sensor and the rear sensor obtains information regarding the same feature.

2. The vehicle control device according to claim 1, wherein the front sensor is an imaging device that captures an image of the front of the vehicle, and
the rear sensor is an imaging device that captures an image of the rear of the vehicle.

3. The vehicle control device according to claim 1, wherein the front sensor and the rear sensor are configured to scan unevenness of a road surface or a change in luminous intensity or color during traveling of the vehicle.

4. The vehicle control device according to claim 1, wherein the predetermined driving state is a state where steering of the vehicle is neutral.

5. The vehicle control device according to claim 1, wherein
the plurality of wheel speed sensors acquire wheel speed pulses of left and right wheels, and
the travel state detected by the at least one ECU is a state where the wheel speed pulses of the left and right wheels coincide with each other.

6. The vehicle control device according to claim 1, wherein
the vehicle comprises an acceleration sensor, and
the predetermined driving state is a state where the acceleration sensor does not detect acceleration.

7. The vehicle control device according to claim 1, wherein
the at least one ECU is configured to estimate a timing for which the rear sensor is to acquire the information of the feature after the front sensor acquires the information of the feature.

8. The vehicle control device according to claim 2, wherein
an elevation angle of the imaging device is changed before the imaging device images the information of the feature.

* * * * *